United States Patent
Bae et al.

(10) Patent No.: US 8,417,872 B2
(45) Date of Patent: Apr. 9, 2013

(54) WRITE AND MERGE METHODS IN MEMORY CARD SYSTEMS FOR REDUCING THE NUMBER OF PAGE COPIES

(75) Inventors: Kyoung-Ryun Bae, Seoul (KR); Hee-Tak Shin, Anyang-si (KR); Jung-Hoon Kim, Suwon-si (KR); Jong-hwan Lee, Hwaseong-si (KR); Yong-Hyeon Kim, Yongin-si (KR); Chang-Eun Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1113 days.

(21) Appl. No.: 12/358,374

(22) Filed: Jan. 23, 2009

(65) Prior Publication Data

US 2009/0193191 A1 Jul. 30, 2009

(30) Foreign Application Priority Data

Jan. 24, 2008 (KR) ........................ 10-2008-0007647

(51) Int. Cl.
*G06F 12/00* (2006.01)
*G06F 13/00* (2006.01)
*G06F 13/28* (2006.01)
*G06F 9/26* (2006.01)
*G06F 9/24* (2006.01)

(52) U.S. Cl.
USPC ........... 711/103; 711/202; 711/206; 711/208; 711/E12.058; 711/E12.059

(58) Field of Classification Search ........................ None
See application file for complete search history.

(56) References Cited

U.S. PATENT DOCUMENTS

| | | | |
|---|---|---|---|
| 6,938,116 B2 * | 8/2005 | Kim et al. | 711/103 |
| 2002/0184436 A1 * | 12/2002 | Kim et al. | 711/103 |
| 2006/0136655 A1 | 6/2006 | Gorobets et al. | |
| 2006/0179212 A1 * | 8/2006 | Kim et al. | 711/103 |
| 2006/0179263 A1 * | 8/2006 | Song et al. | 711/170 |
| 2008/0098195 A1 * | 4/2008 | Cheon et al. | 711/202 |
| 2010/0023676 A1 * | 1/2010 | Moon et al. | 711/103 |

FOREIGN PATENT DOCUMENTS

| | | | |
|---|---|---|---|
| KR | 1020020092487 A | 12/2002 | |
| KR | 1020060021548 A | 3/2006 | |
| KR | 1020060130084 A | 12/2006 | |

\* cited by examiner

*Primary Examiner* — Edward Dudek, Jr.
*Assistant Examiner* — Matthew Chrzanowski
(74) *Attorney, Agent, or Firm* — Volentine & Whitt, PLLC (57) ABSTRACT

A memory card system and related write method are disclosed. The method includes receiving a write request for a predetermined page; performing a write operation on a first log block that corresponds to a first data block including the page; receiving an update request for the page; and performing a write operation on a second log block that corresponds to the first data block. The memory card system includes: at least one non-volatile memory including a data block and a log block for updating the data block; and a memory controller controlling an operation of the non-volatile memory. During a write operation for a predetermined page, the controller controls writing of a first log block corresponding to a first data block including the predetermined page, and controls writing of a second log block during an update operation of the predetermined page.

24 Claims, 7 Drawing Sheets

WRITE AND MERGE METHODS IN MEMORY CARD SYSTEMS FOR REDUCING THE NUMBER OF PAGE COPIES

CROSS-REFERENCE TO RELATED APPLICATIONS

This U.S. non-provisional patent application claims priority under 35 U.S.C. §119 to Korean Patent Application No. 10-2008-0007647 filed Jan. 24, 2008, the subject matter of which is hereby incorporated by reference.

BACKGROUND

The present invention relates to memory card systems, and more particularly, to a write method for memory card systems.

Portable electronic devices such as digital cameras, MP3 players, mobile phones, and personal digital assistants (PDAs) have become significant consumer staples in recent years. Flash memory devices are commonly used as accessory components in conjunction with portable electronic devices. The non-volatile data storage capabilities, low power consumption, and high degree of memory cell integration make flash memory an ideal medium for storing the digital data used in portable electronic devices.

Unfortunately, flash memory is not able to directly perform an over-write operation in a manner similar to that of a conventional hard disk drive, since flash memory must be placed in an initial state or an erase state before writing data. That is, flash memory must first erase a designated portion of available memory before writing new data. This sequence of steps is referred to as an erase-before-write operation.

An erase operation within flash memory generally takes a longer period of time than a write operation. Because an erase unit for flash memory is typically greater in size than a write unit, some memory portion is needlessly erased with each over-write operation. Accordingly, the data initially stored in this unintentionally erased portion of memory must be restored using one or more rewrite operation(s).

Because flash memory must execute an erase operation and a rewrite operation in conjunction with a write operation, the overall efficiency of flash memory write operations is lower than the read operation, and also lower than conventional write operation directed to a hard disk. Additionally, as tens of thousands or hundreds of thousands of erase operations are performed in relation to a particular block of flash memory, the block will ultimately become useless due to the conventionally understood "wearing" phenomenon. Accordingly, a wear leveling operation must be performed on the flash memory in order to extend the useful life of the memory.

The so-called flash translation layer (FTL) is specialized software running in relation to flash memory to overcome the above-mentioned limitations and effectively manage the use of the flash memory. The FTL receives a logical address (LA) and then converts it to a physical address (PA). Here, the physical address PA is an actual address used to store data in the flash memory.

In order to manage the overall address mapping operation, an address mapping table is generally required. The address mapping table is typically stored in an associated random access memory (RAM) during operation of the flash memory. The address mapping table includes all logical addresses and corresponding physical addresses. The size of the address mapping table may vary according to the number and size of mapping units, as well as various mapping methods used in relation to the mapping unit. Representative mapping methods includes (e.g.) page mapping, block mapping, and hybrid mapping.

The page mapping method utilizes a page mapping table. The page mapping table enables the execution of a mapping operation by page unit, and stores a logical address and corresponding physical address. The block mapping method utilizes a block mapping table. The block mapping table enables the execution of a mapping operation by block unit, and stores a logical block and a corresponding physical block. The hybrid mapping method utilizes aspects of both the page mapping method and the block mapping method.

One memory block generally includes tens or hundreds of pages. Accordingly, if the page mapping method is used, the size of the mapping table is increased at least ten or hundred times than the block mapping method. That is, the page mapping method requires a great deal of RAM memory to store the mapping table, as compared with other methods.

On the other hand, because the block mapping method performs a mapping operation by block unit, the size of the resulting mapping table, particularly as compared with the page mapping method, is quite small. However, in the block mapping method, because a position of a page to be used in a block is fixed, a merge operation must be performed more frequently.

The hybrid mapping method uses the page mapping method with respect to a log block and the block mapping method with respect to a data block. Since the hybrid mapping method uses two mapping methods, the size of a mapping table and the number of merge operations can be reduced.

During a write operation, "write data" or data to be stored in a data block is first stored in a log block through an out-of-place ordering method. That is, regardless of logical page numbers corresponding to pages transmitted from a host, the write data is stored in an empty page of the log block. If all pages of the log block are used or there is no usable log block, page data stored in a log block and a data block corresponding thereto will be stored in a new data block using a merge operation. Unlike the log block, the write data is stored in the data block through an in-place ordering method. That is, in accordance with the logical page number of page data to be stored, the page data is stored in a page of a corresponding position in the data block.

If a merge operation is performed during the above method, a plurality of page and block copy operation must be performed. For example, if one data block includes four pages, four page copies and two block erase operations must be performed. Therefore, when the hybrid mapping method is used, performance of a memory card system can be deteriorated due to the large number of required page copy operations.

In the hybrid mapping method, one data block allocates only one log block. Accordingly, if data in a particular page is updated, the previous page of data becomes invalid, such that valid pages and invalid pages exist together in a log block. If a log block having invalid pages and a data block corresponding thereto are merged, a large number of page copies will be required. Because the log block including invalid pages requires a large number of page copies during a merge operation, performance of a memory card system is deteriorated.

SUMMARY

Embodiments of the present invention provide a memory card system capable of reducing the number of page copy operations during a merge operation. Embodiments of the invention also provide write and merge methods for use within a memory card system having similar benefits.

In one embodiment the invention provides a write method for a memory card system, the method comprising; receiving a write request for a page, performing a write operation on a first log block corresponding to a first data block including the page, receiving an update request for the page, and performing a write operation on a second log block corresponding to the first data block.

In another embodiment the invention provides a merge method for a memory cad system including a data block and a log block for updating the data block, the method comprising; generating a second data block by merging a first data and a corresponding first log block, wherein pages in the second data block are written to using an out-of-place ordering method.

In another embodiment the invention provides a memory card system comprising; at least one non-volatile memory including a data block and a log block for updating the data block, and a memory controller controlling an operation of the non-volatile memory, wherein during a write operation for a predetermined page, the controller controls a write operation directed to a first log block corresponding to a first data block including the predetermined page, and further controls a write operation directed to a second log block during an update operation of the predetermined page.

BRIEF DESCRIPTION OF THE FIGURES

The accompanying figures are included to provide a further understanding of the present invention, and are incorporated in and constitute a part of this specification. The drawings illustrate exemplary embodiments of the invention and, together with the description, serve to explain principles of the invention. In the figures.

DETAILED DESCRIPTION OF EMBODIMENTS

Embodiments of the invention will now be described in some additional detail with reference to the accompanying drawings. The present invention may, however, be embodied in different forms and should not be construed as being limited to only the illustrated embodiments. Rather, these embodiments are presented as teaching examples.

Figure 1:
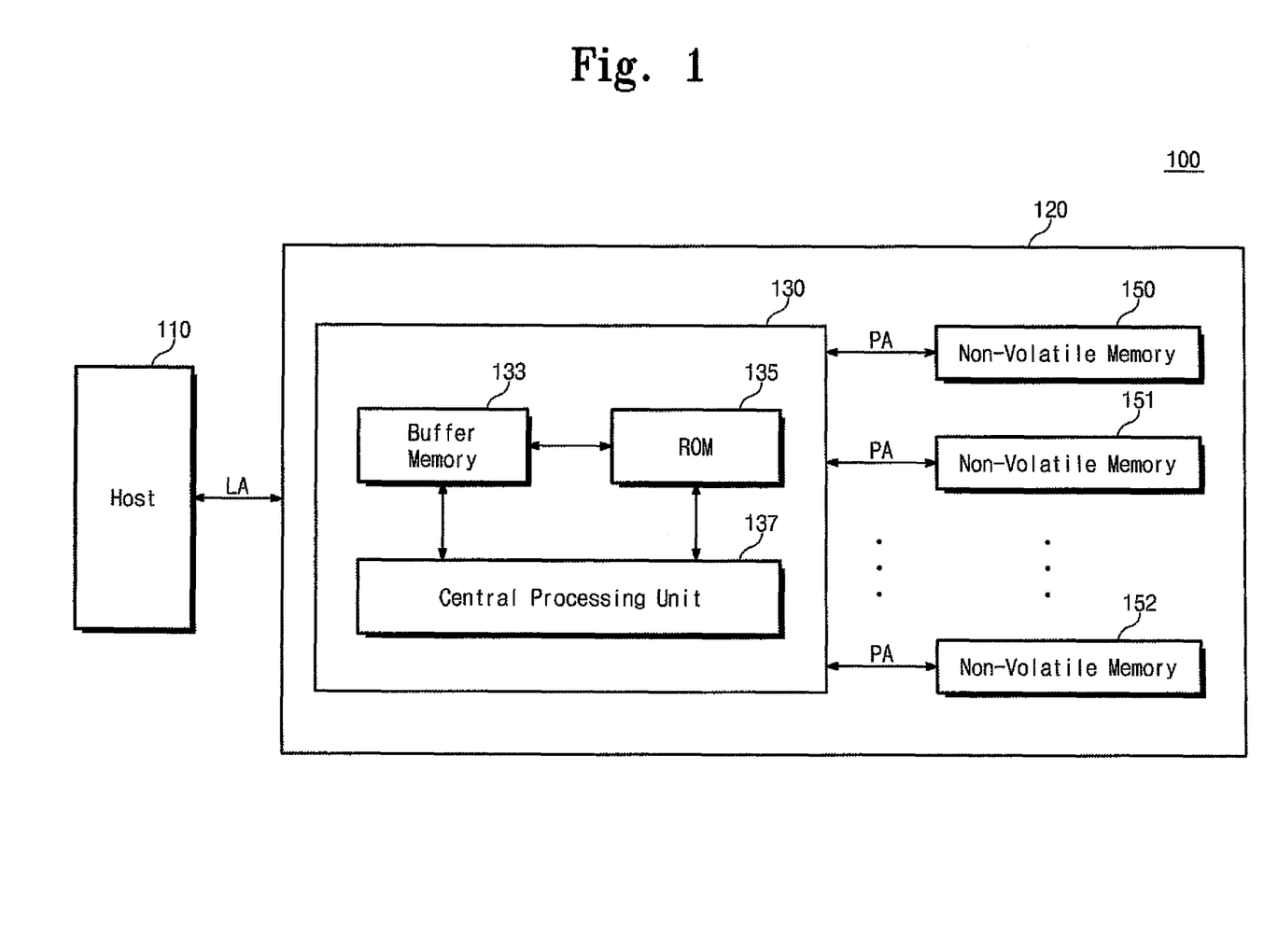
FIG. 1 is a block diagram illustrating a memory card system.

FIG. 1 is a block diagram illustrating a memory card system. Referring to FIG. 1, memory card system 100 includes a host 110 and a memory card 120. The memory card 120 includes a memory controller 130 and at least one of non-volatile memories 150 to 152. The memory controller 130 includes a buffer memory 133, a read only memory (ROM) 135, and a central processing unit 137. The buffer memory 133 may include DRAM, SRAM, a phase-change RAM (PRAM), a magnetic RAM (MRAM), or a ferro-electric RAM (FRAM). The non-volatile memories 150 to 152 may include a flash memory, PRAM, MRAM, and FRAM, and the flash memory is used to describe embodiments of the present invention.

As is well known to those skilled in the art, the flash memories 150 to 152 include a plurality of memory cells that have a string structure. A set of memory cells is typically called a memory cell array. The memory cell array of the flash memory is organized into a plurality of memory blocks. Each memory block is further organized into a plurality of pages. Each page includes a plurality of memory cells sharing a word line.

The flash memory has a defined data unit size (or "unit") used during read and/or write operations which may be different from the unit used during the erase operation. That is, in the illustrated embodiments described hereafter, it is assumed that the flash memories 150 to 152 perform an erase operation by a block unit, and perform a read or write operation by a page unit. Additionally, it is assumed that the flash memories 150 to 152 are not able to perform direct over-write operations. Accordingly, the flash memories 150 to 152 must perform an erase operation before performing a write operation.

Due to this property of the flash memory, in order to use the flash memories 150 to 152 as a direct component replacement for a conventional hard disk, some additional management for a read/write/erase operation is required. A flash translation layer (FTL) is used for this purpose within the illustrated embodiments. The FTL may be stored in the ROM 135 of the memory controller 130 or in the flash memories 150 to 152 and may be executed (or driven) in conjunction with the buffer memory 133.

The memory controller 130 receives a logical address LA from the host 110, and converts it into a corresponding physical address PA. The physical address PA is provided to the flash memories 150 to 152. The memory controller 130 includes an address mapping table to facilitate address conversion. The address mapping table is driven in the buffer memory 133.

As noted above, various address mapping methods may be used in relation to a defined mapping unit. Representative address mapping methods include page mapping, block mapping, and hybrid mapping.

The page mapping method performs an address mapping operation by a page unit. According to the page mapping method, since an address converting operation is performed by a page unit, a merge operation for page arrangement is not necessary. On the other hand, the page mapping method requires a large size of an address mapping table. That is, a large capacity of the buffer memory 133 is required to use the page mapping method. In other words, the page mapping method does not need to perform a merge operation but requires a large capacity of memory for a page mapping table.

The block mapping method performs an address mapping operation by a memory block unit. The block mapping method can reduce a memory size more compared to the page mapping method. Moreover, the block mapping method needs to perform a large number of merge operations for page arrangement. The hybrid mapping method uses the page mapping method and the block mapping method at the same time, such that the size of a mapping table and the number of merge operations can be reduced. The hybrid mapping method will be described in more detail below.

Figure 2:
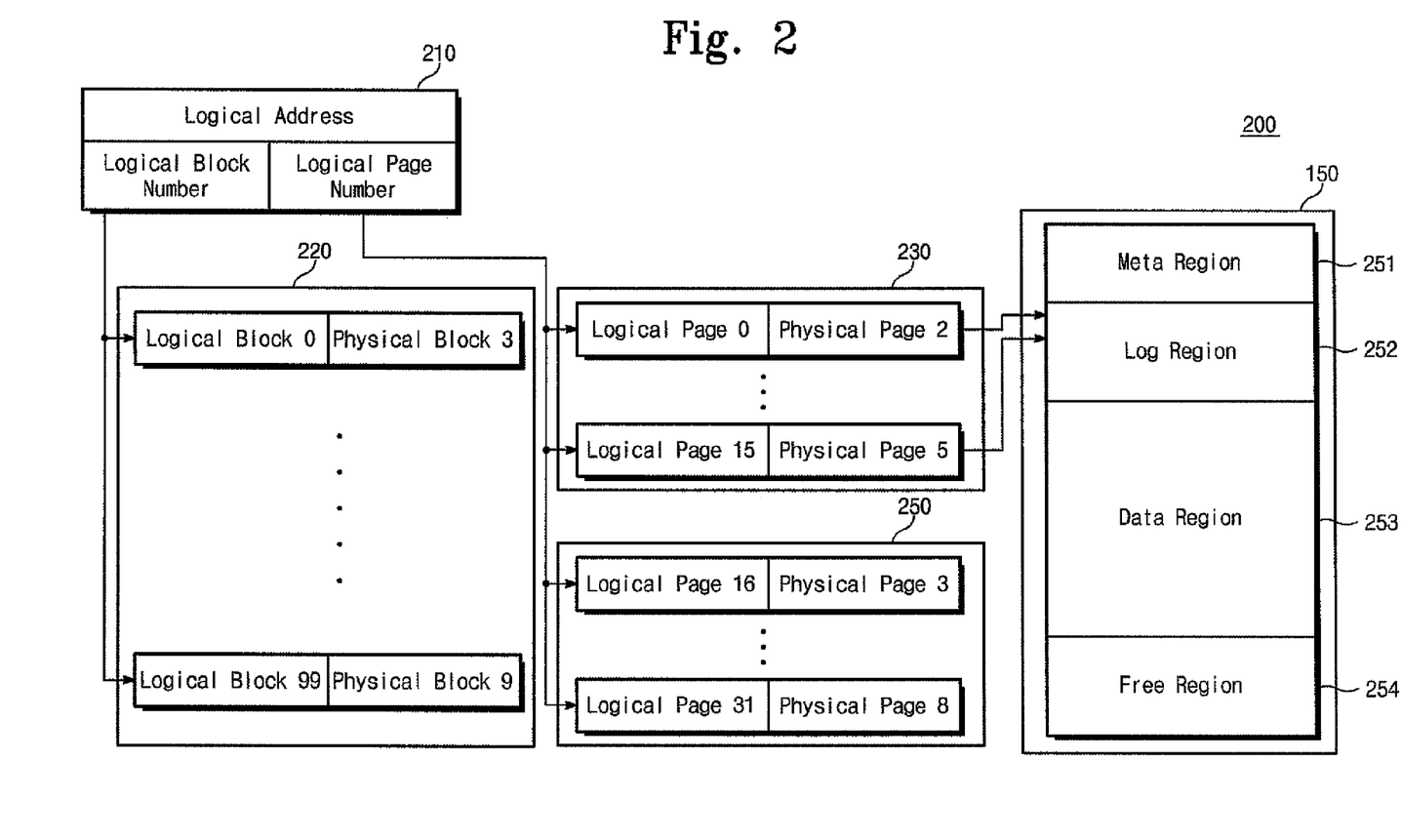
FIG. 2 is a block diagram illustrating a hybrid mapping method for the memory card system of FIG. 1.

FIG. 2 is a block diagram illustrating a hybrid mapping method for the memory card system of FIG. 1. Referring to FIG. 2, the non-volatile memory (e.g., 150 of FIG. 1) includes a meta region 251, a log region 252, a data region 253, and a free region 254. The data region 253 includes a plurality of data blocks and stores user data. The log region 252 includes a plurality of log blocks and is allocated to a specific data block. The free region 254 includes a plurality of free blocks. The free block is changed into a log block if there is a lack of a log block. The meta region 251 stores a variety of mapping tables such as the block mapping table 220 and the page mapping table 230. The block mapping table 220 is used to convert a logical block number to a physical block number. The page mapping table 230 is used to convert a logical page number into a physical page number.

Referring to FIG. 2, the memory controller 130 of FIG. 1 receives a logical address LA 210 from the host 110 of FIG. 1, and converts it into a physical address PA using a mapping table. The logical address LA 210 is divided into a logical block number and a logical page number. Through the logical block number, a physical block corresponding to the block mapping table 220 is located, and through the logical page number, a physical page corresponding to the page mapping table 230 is located.

If data is written in a specific data block, the data is not directly written in a specific data block but is first written in an allocated log block. When the host sends a write request, the FTL determines whether there is a log block allocated to a corresponding data block or not. If there is a log block allocated to a corresponding data block, the allocated log block is used. However, if there is no allocated log block in a corresponding data block, the corresponding data block receives a new log block allocated from a free block. An erase operation is performed on the new allocated log block before a program operation.

Typically, there are valid pages and invalid pages in the log block and the data block. The valid page of the log block stores the latest data, and the invalid page is no longer usable because updated data is stored in another page. The valid page of the data block is a page having no updated data in the log bock, and the invalid page (i.e., no usable page) is a page having updated data in the log block.

When all pages in the log block are used or there is no usable log block, a merge operation is performed. Through the merge operation, valid pages of the log block and the data block are copied into a new data block. The data block or the log block, which is erased after the merge operation, is converted into a free block. Like this, any one memory block can be converted into a data block, a log block, and a free block through the merge operation. Changes of mapping information through the merge operation are stored in the meta region 251.

This merge operation can be performed when the number of useable log blocks is less than a predetermined number.

Figure 3:
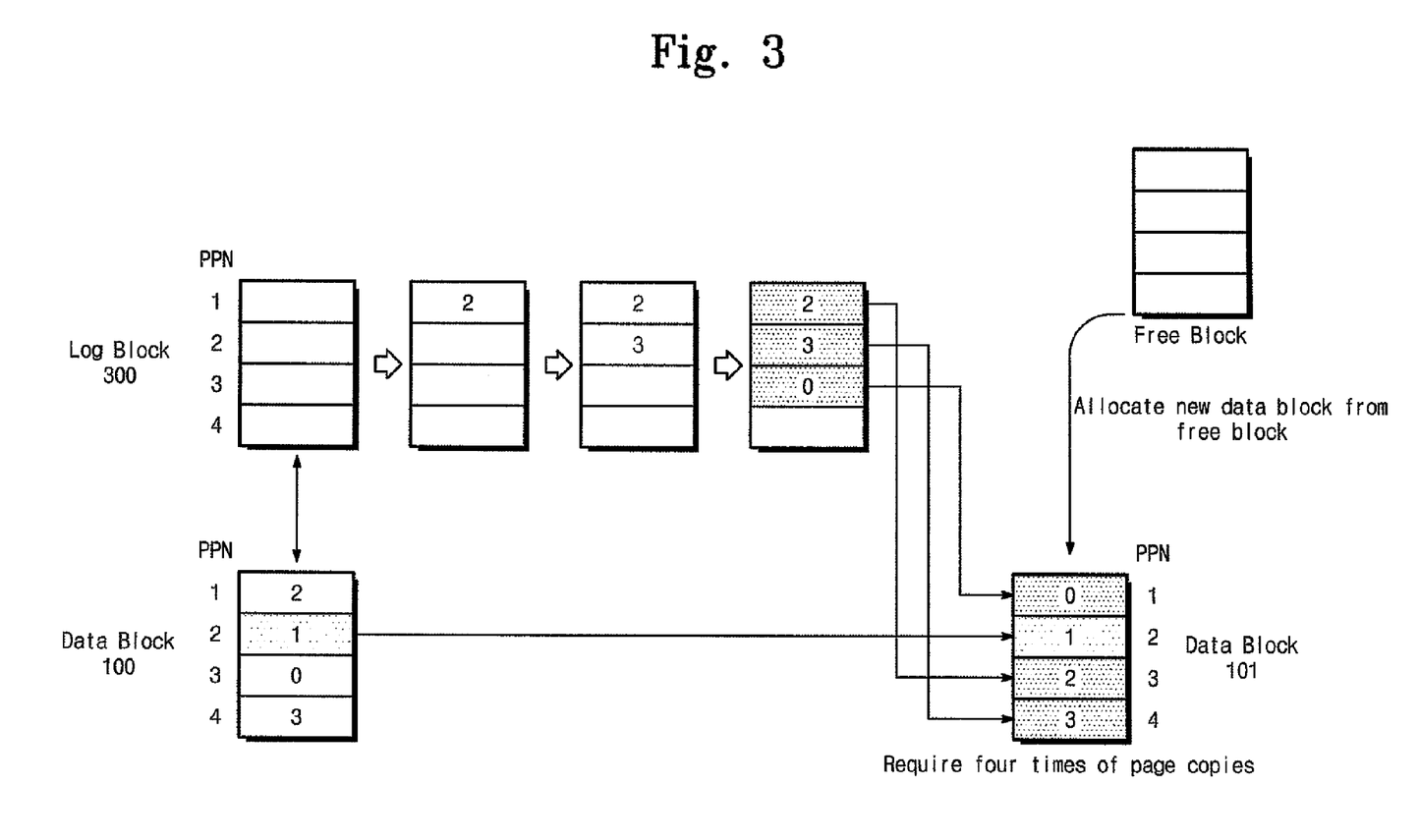
FIG. 3 is a conceptual illustration of a merge method for a data block and a log block of FIG. 2.

FIG. 3 conceptually illustrates a merge method for the data block and the log block of FIG. 2. Referring to FIG. 3, the log block 300 is allocated to one data block 100. Each of the data block 100 and the log block 300 includes four physical pages. A physical page number PPN of FIG. 3 means a page order of each memory block.

The memory controller 130 of FIG. 1 performs a page write operation on the log block 300 corresponding to the data block 100 in response to a write request. Referring to FIG. 3, the host 110 of FIG. 1 sends a write request in the logical page order of 2, 3, 0 and 1. Here, the logical page 1 is stored in the physical page PPN2 of the data block 100.

Once a write request is received with respect to the logical page 2, a write operation is performed on the first physical page PPN1 of the log block 300. Next, once a write request is received with respect to the logical page 3, a write operation is performed on the physical page PPN2 of the log block 300. Additionally, once a write request is received with respect to the physical page 0, a write operation is performed on the physical page PPN3 of the log block 300.

At this point, if a situation arises in which the log block 300 needs to be changed into a free block because an entire log block is insufficient, the memory controller 130 performs a merge operation. After allocating a new data block 101, logical pages 2, 3, and 0 stored in the physical pages PPN1, PPN2, and PPN3 of the log block 300 and the logical page 1 stored in the physical page PPN2 are copied into the new data block 101.

First, the logical page 0 of the log block 300 is copied to a first physical page PPN1 of the new data block 101. Next, the logical page 1 of the data block 100 is copied to a physical page PPN2 of the new data block 101. Then, the logical pages 2 and 3 of the log block 300 are copied into physical pages PPN3 and PPN4 of the new data block 101, respectively.

According to the hybrid mapping method of FIG. 3, the valid pages of the log block 300 and the data block 100 are copied to the new data block 101 through the merge operations. The logical pages 0 to 3 are sequentially written into the new data block 101. Sequentially writing of the logical pages in one block is called an in-place ordering method. On the contrary, arbitrarily writing of the logical pages in one block is called an out-of-place ordering or random-place ordering method. In the hybrid mapping method, pages in a log block are written through the out-of-place ordering method and pages in a data block are written through the in-place ordering method.

If a write request is received in the logical page order of 0, 1, 2, and 3, these logical pages are sequentially written in the first to fourth physical pages of the log block 300. The pages written in the log block 300 can be directly registered as a data block without an additional page copy. This is because the log block 300 arranges pages in relation to an in-place ordering.

However, if a write request is arbitrary, a page copy operation for meeting the order of a logical page is necessary in order to register as a data block. In the embodiment of FIG. 3, a page copy operation needs to be performed four times. In the same manner, the hybrid mapping method of FIG. 3 requires a large number of page copies in order to arrange pages in a data block in relation to an in-place ordering. This outcome reduces the overall performance of the memory system.

According to the hybrid mapping method, one data block allocates only one log block. If a page where data is already written in a log block is updated, the current page becomes an invalid page, and a newly written page becomes a valid page. Accordingly, there are a valid page and an invalid page simultaneously in the log block. When a log block including an invalid page is merged with a corresponding data block, a large number of page copies are required. Similarly, a log block including an invalid page requires a large number of page copies during a merge operation. Consequently, the performance of a memory card system can be deteriorated.

Figure 4:
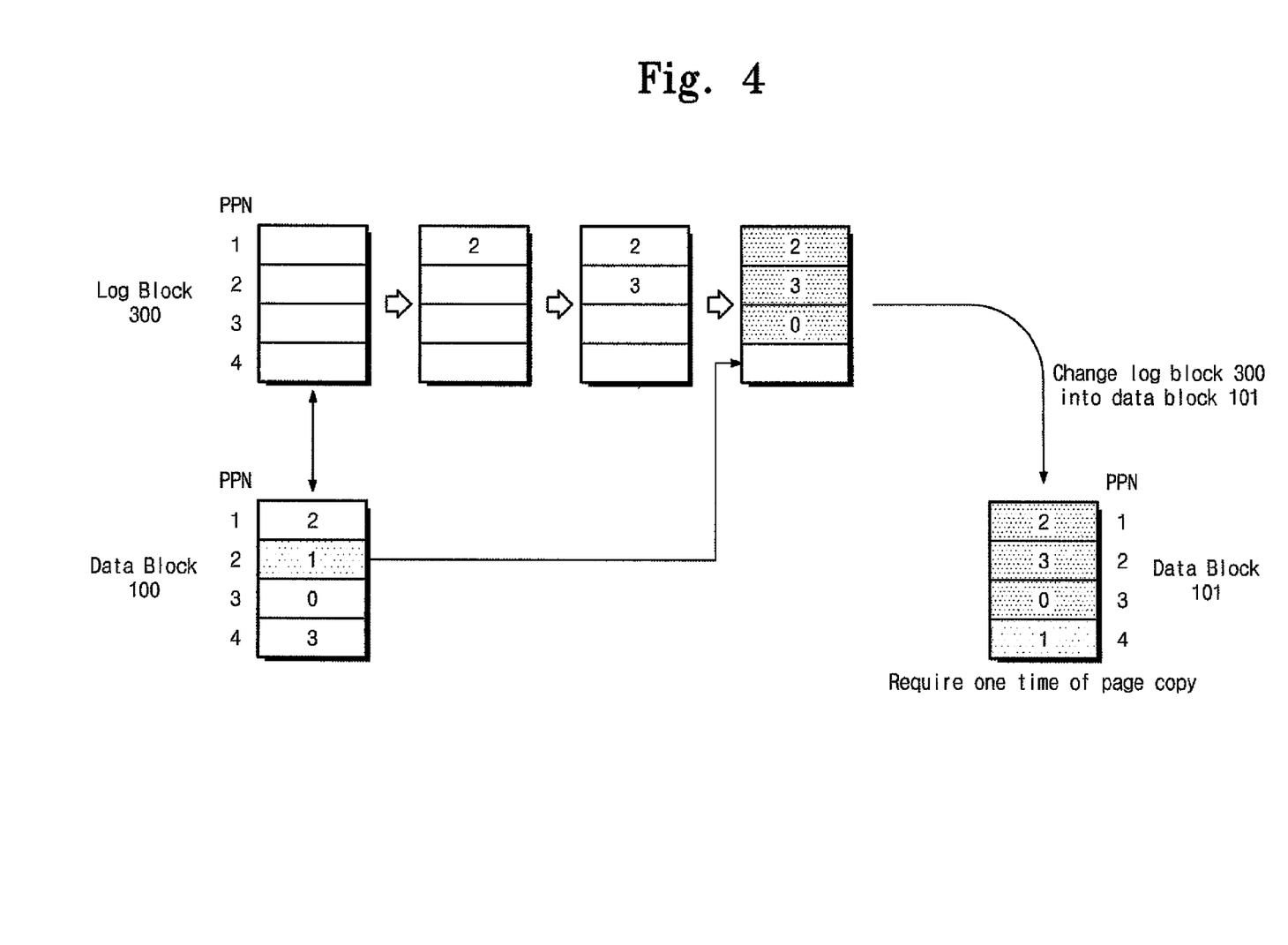
FIG. 4 is a conceptual illustration of a merge method for a data block and a log block according to an embodiment of the invention.

FIG. 4 is a conceptual illustration of a merge method for a data block and a log block according to an embodiment of the invention. As mentioned in FIG. 3, the memory controller 130 of FIG. 1 performs a page write operation on the log block 300 corresponding to the data block 100 in response to a write request.

Once a write request is received for a logical page 2, a write operation is performed on the first physical page PPN1 of the log block 300. Next, once a write operation is received for a third logical page 3, a write operation is performed on the second physical page PPN2 of the log block 300. Next, once a write operation is received for a logical page 0, a write operation is performed on the third physical page PPN3 of the log block 300.

The memory controller 130 determines whether a merge operation is required or not, and if so, performs the merge operation. The merge operation is an operation generating a new data block by separately collecting valid pages of a log block corresponding to a data block. The memory controller 130 performs a merge operation when there is no free page in a corresponding log block or there is no free page that can be allocated to a new log block.

In the illustrated embodiment of the invention, pages in a log block and a data block can be written in relation to an out-of-place ordering. Because of this, embodiments of the invention drastically reduce the number of page copies that must be performed during a merge operation. Referring to FIG. 4, if the data block 100 and the corresponding log block 300 need to be merged, a logical page 1 stored in a second physical page PPN2 of the data block 100 is copied into the log block 300 first. Next, the log block 300 is changed into a data block 101, and the data block 100 is changed into the free block.

In the illustrated embodiment of the invention, it is not necessary for a new data block to be allocated from a free block. That is, a new data block may be generated from a data block to be merged or a corresponding log block.

Additionally, in order to register as a data block, a page copy operation for meeting the order of a logical page becomes unnecessary. The only required operation is that a block having a small number of valid pages among data blocks or log blocks is copied into a block having a large number of valid pages. In the embodiment of FIG. 4, only one page copy operation is required because a valid page of the data block 100 is copied into the log block 300. In this manner, the merge operation for the embodiment of the invention illustrated in FIG. 4 significantly reduces the number of required page copies. Consequently, the overall performance of the constituent memory system can be improved.

In order to manage pages in a log block and a data block using an out-of ordering method, a page mapping table for the log block and the data block is required. Each of the non-volatile memories 150 to 152 of FIG. 1 stores a page mapping table of the log block and the data block in the meta region 251 of FIG. 2. The page mapping tables should be loaded into the buffer memory 133 of FIG. 1 in the memory controller 130. However, since capacity of the buffer memory 133 is limited, only a page mapping table for a currently-accessed data block is loaded from the non-volatile memory into the buffer memory 133. All of the page mapping table for a log block can be loaded into the buffer memory 133 regardless of accesses.

Figure 5:
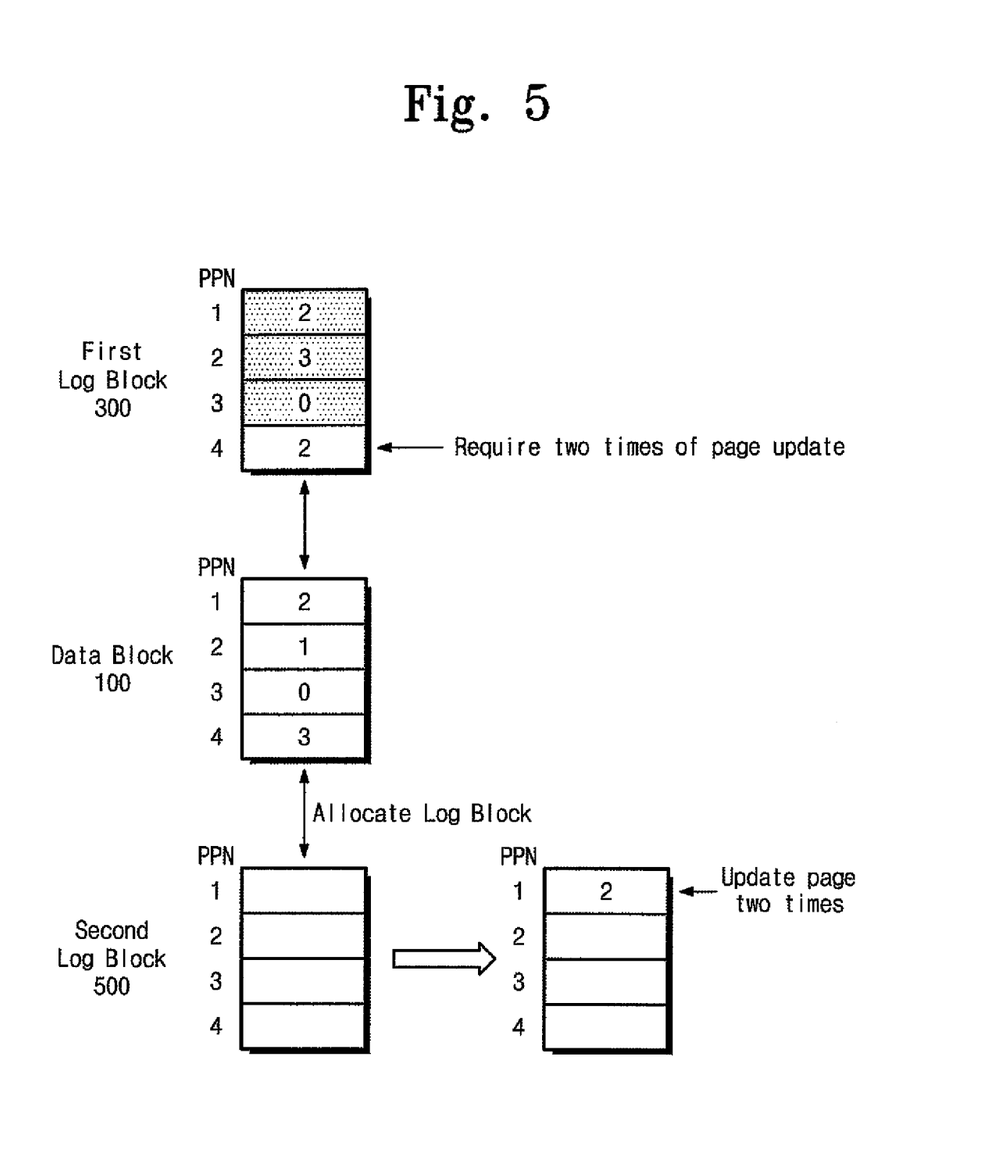
FIG. 5 is a conceptual illustration of a write method for a memory card system according to an embodiment of the invention.

FIG. 5 is a conceptual illustration of a write method for a memory card system according to an embodiment of the invention. The memory controller 130 of FIG. 1 performs a page write operation in a first log block 300 corresponding to a data block 100 in response to a write request.

Once a write request is received for a logical page 2, a write operation is performed on a first physical page PPN1 of the first log block 300. Next, once a write request is received for a logical page 3, a write operation is performed on a second physical page PPN2 of the first log block 300. Then, once a write request is received for a logical page 0, a write operation is performed on the third physical page PPN3 of the first log block 300.

At this point, it will be assumed that a page update request is received.

For example, if the update request is received for a logical page 2, a write operation is performed on the fourth physical page PPN4 of the first log block 300 in a typical method. Accordingly, the first physical page PPN1 of the first log block 300 becomes an invalid page such that a large number of page copies are required once a merge operation is performed.

According to the illustrated embodiment of the invention, by preventing the creation of an invalid page in the first log block 300, the number of page copies may be drastically reduced during a subsequent merge operation directed to a data block and a log block. Referring to FIG. 5, when an update request is received for the logical page 2, a new log block (e.g., a second log block 500) is allocated from free blocks. Next, a write operation is performed on a first physical page PPN1 of the second log block 500. Even if an update request is received for the logical page 2 again, a write operation is performed on the second log block 500 not the first log block 300. Accordingly, no invalid page is created in the first log block 300.

Figure 6:
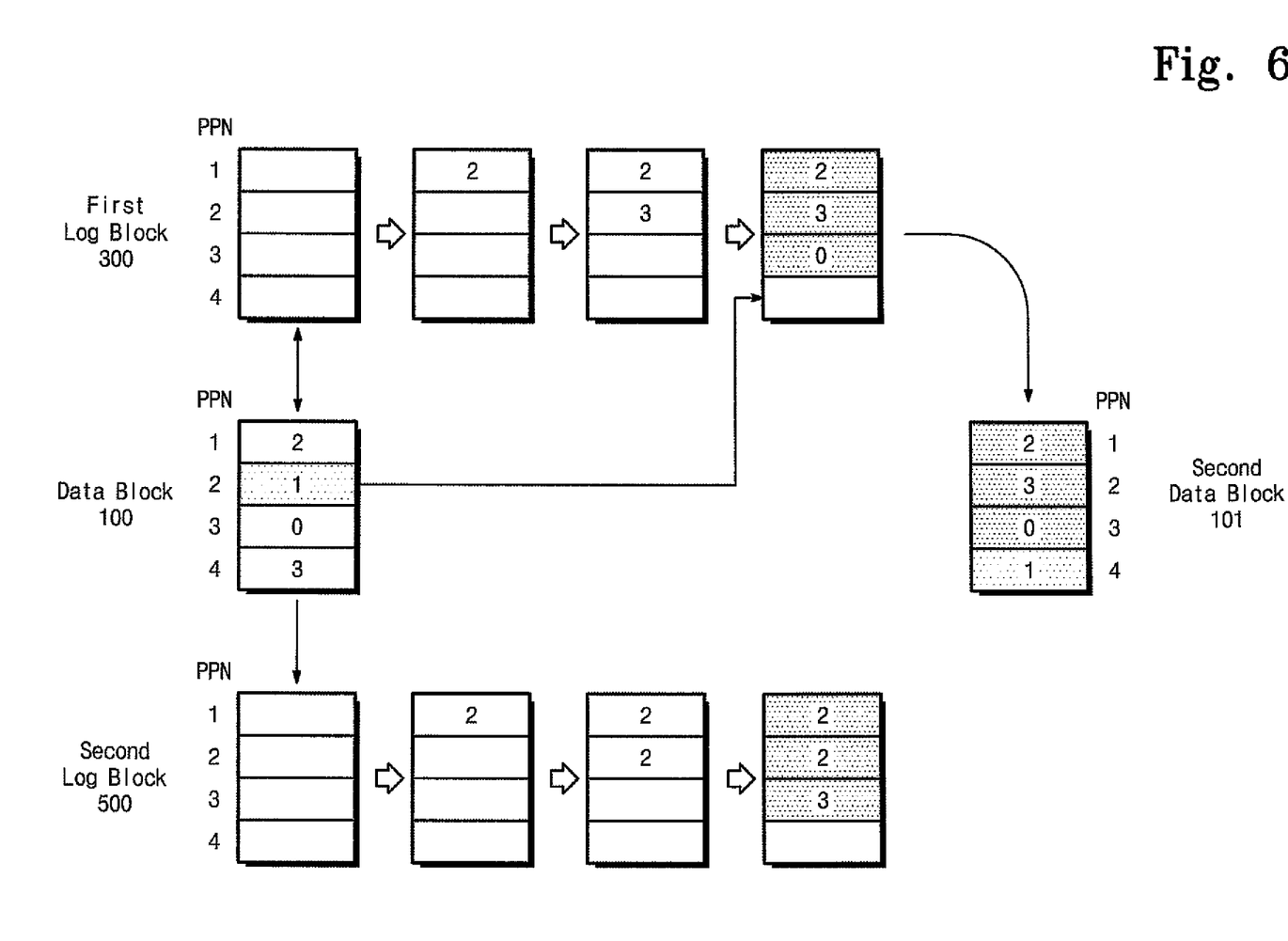
FIG. 6 is a conceptual illustration of a merge method for a data block and a log block according to an embodiment of the invention.

FIG. 6 is a conceptual illustration of a merge method for a data block and a log block according to an embodiment of the invention.

The memory controller 130 of FIG. 1 determines whether or not a merge operation is required, and if required, performs the merge operation. The merge operation generates a new data block by separately collecting valid pages of a data block and a corresponding log block.

The memory controller 130 performs a merge operation when there is no free block to be allocated for a new log block or the number of usable log blocks is less than a predetermined number. In the present invention, if a first data block 100 and a corresponding log block need to be merged, a first log block 300 having no invalid page is merged with the first data block 100.

Referring to FIG. 6, if there is a free page in the first log block 300, a logical page 1 stored in the second physical page PPN2 of the first data block 100 is copied into the first log block 300 first. Then, the first log block 300 is changed into a second data block 101, the first data block 100 is changed into a free block, and a second log block 500 is changed into the first log block 300.

However, if there is no free page in the first log block 300 and there is a free page in the second log block 500, valid pages of the first log block 300 are copied into free pages of the second log block 500 first. Next, the second log block 500 is changed into the second data block 101, and the first log block 300 is changed into a free block.

If there is no free page in the first log block 300 and there is a free page in the second log block 500, valid pages of the first data block 100 and the first log block 300 are copied into free pages of the second log block 500. Next, the second log block 500 is changed into the second data block 101, and the first data block 100 and the first log block 300 are changed into a free block.

If there is no free page in the first log block 300 and the second log block 500, a first free block is allocated first. First, the first free block is allocated from spare blocks not from general free blocks. Next, valid pages of the first log block 300 and the second log block 500 are copied into the first free block. Then, the first log block 300 and the second log block 500 are changed into free blocks, and the first free block is changed into the first data block 100.

In this manner, the merge operation of FIG. 6 can significantly reduce the number of page copies because there are no invalid pages created in the first log block 300. Consequently, the overall performance of the memory system can be improved.

The memory controller 130 may perform the following three merge operations when there is no free page in the first log block 300.

First, the first data block 100 is changed into a free block. Then, the first log block 300 is changed into a first data block, and the second log block 500 is changed into a first log block.

Second, valid pages of the first log block 300 are copied into free pages of the second log block 500. Next, the first data block 100 and the first log block 300 are changed into free blocks, and the second log block 500 is changed into a first data block.

Third, a first free block is allocated. Here, the first free block is allocated from general free blocks, or allocated from spare blocks. Next, valid pages of the second log block are copied into the first free block. Next, the first data block 100 and the second log block 500 are changed into free blocks. The first log block 300 is changed into a first data block, and the first free block is changed into a first log block.

If there is no free page in the first and second log blocks 300 and 500, a merge operation can be performed as follows. First, a first free block is allocated. Here, the first free block can be allocated from general free blocks, or from spare blocks. Next, valid pages of the first log block 300 and the second log block 500 are copied into the first free block. Next, the first log block 300 and the second log block 500 are changed into free blocks, and the first free block is changed into a first log block.

Therefore, the number of page copies can be drastically reduced because there is no invalid page in the first log block. Consequently, performance of the memory system can be improved.

Figure 7:
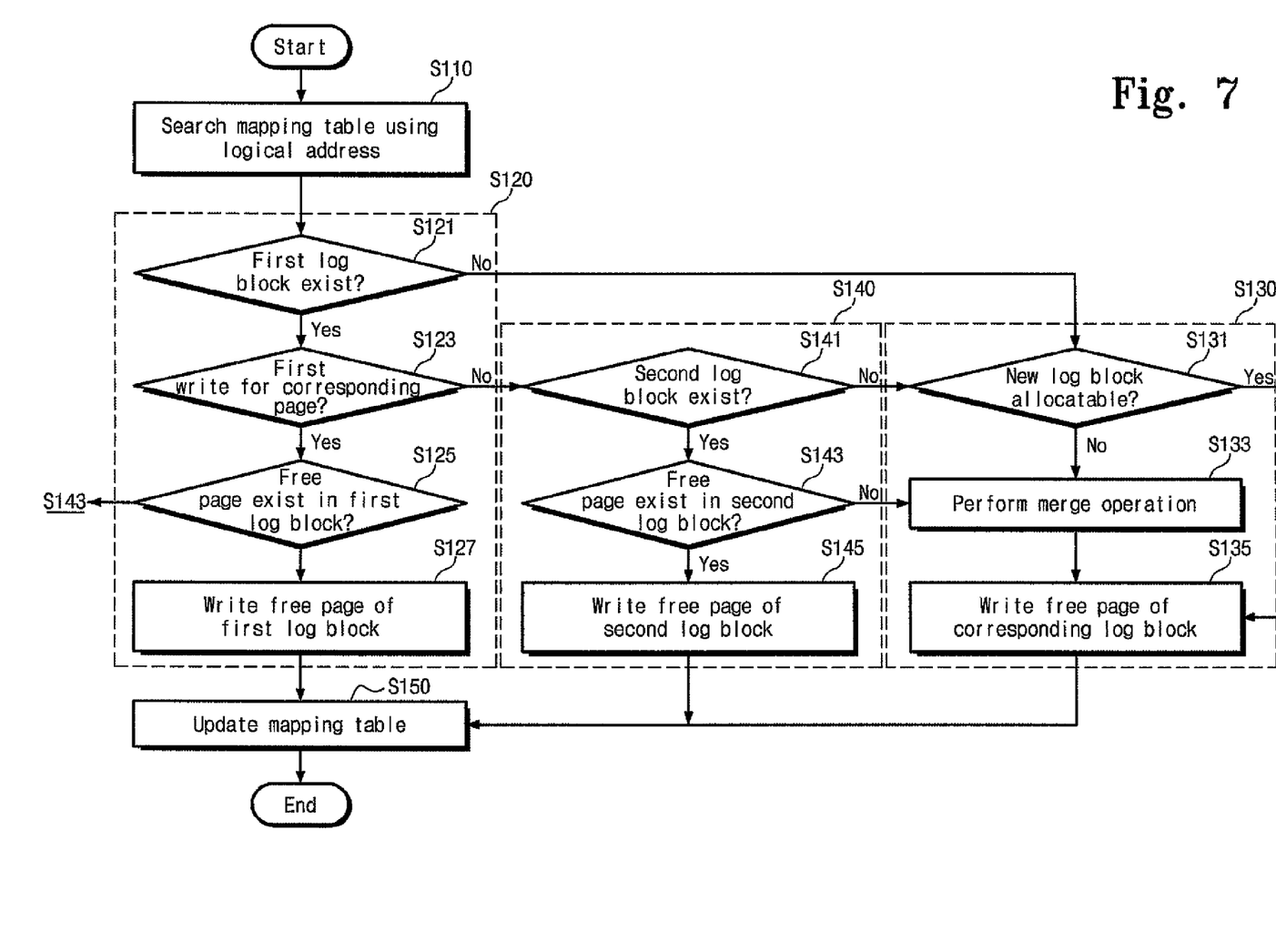
FIG. 7 is a flowchart summarizing a write method for a memory card system according to an embodiment of the invention.

FIG. 7 is a flowchart summarizing a write method for a memory card system according to an embodiment of the invention. The write method of FIG. 7 will be described in some additional detail with reference to the memory card system of FIG. 1.

In operation S110, the memory controller 130 of FIG. 1 receives a write request, a logical address, and data from the host 110 of FIG. 1, and searches a mapping table loaded in the buffer memory 133 of FIG. 1 through a logical address.

In operation S120, the memory controller 130 determines whether there is a log block corresponding to a data block and there is a free page in the corresponding log block. Referring to FIG. 7, the memory controller 130 searches a data block through a mapping table first and determines whether there is a corresponding first log block in operation S121. According to a determination result of operation S121, if there is no first log block, it proceeds to operation S130. But, if there is the first log block, it is determined whether a write request for a calculated corresponding page is the first or not through a logical address in operation S123.

According to a determination result of operation S123, if the write request is not the first, it proceeds to operation S140. However, if the write request is the first, it is determined whether there is a free page in the first log page or not in operation S125. According to a determination result of operation S125, if there is no free page, it proceeds to operation S143. However, if there is a free page, data transmitted from the host are written in the free page of the first log block in operation S127. Next, a mapping table is updated in operation S150, and the write operation is completed.

Operation S130 is performed only when it is determined that there is no first log block corresponding to a data block in operation S121. If there is no corresponding first log block, the memory controller 130 determines whether a new log block can be allocated from a free block in operation S131. According to a determination result of operation S131, if a new log block can be allocated from a free block, a write operation is performed on a free page of a corresponding log block in operation S135, and a mapping table is updated in operation S150. However, according to a determination result of operation S131, if a new log block cannot be allocated from a free block, a merge operation is performed in operation S133, and then operations S135 and S150 are performed.

Operation S140 is performed only when it is determined that the write request for a corresponding page is not the first in operation S123. That is, operation S140 is performed only when an update request for a corresponding page is received. First, it is determined whether there is a second log block or not in operation S141. According to a determination result of operation S141, if there is no second log block, it is determined whether a new log block can be allocated from a free block or not in operation S131. The mentioned operations S133, S135, and S150 are performed. However, if there is a second log block, it is determined whether there is a free page in the second log block in operation S143.

According to a determination result of operation S143, if there is a free page, data transmitted from host are written in free pages of the second log block in operation S145, and the mapping table is updated in operation S150. According to a determination result of operation S141, if there is no free page of the second log block, operations S133, S135, and S150 are sequentially performed.

As mentioned above, a memory card system of the present invention changes a log block based on a first write request or an update request with respect to a corresponding page. Therefore, an invalid page can be removed. Additionally, because a write operation is performed on pages in a data block through an out-of-ordering method, the number of page copies can be reduced during a merge operation. Therefore, the present invention can improve performance of the memory card system.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A write method for a memory card system, the method comprising:
    receiving a write request for a page;
    allocating a first log block to a first data block including the page;
    performing a write operation on the first log block corresponding to the first data block;
    receiving an update request for the page;
    allocating a second log block to the first data block, while the first log block is allocated to the first data block; and
    performing a write operation on the second log block corresponding to the first data block.

2. The method of claim 1, wherein the first log block and the second log block are generated from respectively different free blocks.

3. The method of claim 1, further comprising:
    determining whether there is a free page in the first or second log block.

4. The method of claim 3, further comprising:
upon determining that there is no free page in the first log block, returning the first data block to a free block; and
changing the first log block into the first data block.

5. The method of claim 4, further comprising:
changing the second log block into the first log block.

6. The method of claim 3, further comprising:
upon determining that there is no free page in the first log block, allocating a first free block;
copying valid pages of the second log block into the first free block; and
returning the first data block and the second log block to second and third free blocks, respectively, and changing the first log block and the first free block into the first data block and the first log block, respectively.

7. The method of claim 3, further comprising:
upon determining that there is no free page in the second log block, allocating a first free block;
copying valid pages of the first log block and the second log blocks into the first free block; and
returning the first log block and the second log block to second and third free blocks, respectively, and changing the first free block into the first log block.

8. The method of claim 1, further comprising:
determining whether there is a free block to be allocated to the first or second log block, or whether a number of usable log blocks is less than a predetermined number.

9. The method of claim 8, further comprising:
generating a third data block by merging a second data block and a corresponding third log block,
wherein the third log block is written to in response to a first write request for a page in the second data block, and
a fourth log block is written to in response to an update request for the page.

10. The method of claim 9, further comprising:
copying corresponding pages of the second data block into free pages of the third log block; and
returning the second data block to a free block and changing the third log block into the third data block.

11. The method of claim 10, further comprising:
changing the fourth log block into the third log block.

12. The method of claim 9, further comprising:
copying valid pages of the second data block and the third log block into free pages of the fourth log block; and
returning the second data block and the third log block into free blocks and changing the fourth log block into the third data block.

13. The method of claim 9, further comprising:
copying valid pages of the third log block into free pages of the fourth log block; and
returning the third log block to a free block and changing the fourth log block into the third data block.

14. The method of claim 9, further comprising:
allocating a first free block;
copying valid pages of the third log block and the fourth log block into the first free block; and
changing the third log block and the fourth log block into second and third free blocks, respectively, and changing the first free block into the third log block.

15. The method of claim 1, further comprising:
loading a page mapping table for each of pages in the first data block and the log block; and
updating the page mapping table.

16. A memory card system comprising:
at least one non-volatile memory including a first data block and first and second log blocks for updating the first data block, the second log block being allocated to the first data block for a time during which the first log block is allocated to the first data block; and
a memory controller controlling an operation of the non-volatile memory,
wherein during a write operation for a predetermined page, the controller controls a write operation directed to the first log block corresponding to the first data block including the predetermined page, and further controls a write operation directed to the second log block during an update operation of the predetermined page.

17. The memory card system of claim 16, wherein the first log block and the second log block are generated from respectively different free blocks.

18. The memory card system of claim 16, wherein the memory controller controls a write operation directed to pages in a second data block using an out-of-place ordering method, the second data block being generated by merging the first data block and the first log block.

19. The memory card system of claim 16, wherein the memory controller comprises a buffer memory adapted to temporarily store a plurality of page mapping tables of pages in the data block and the log block, and load only a page mapping table for a currently-accessed data block from the non-volatile memory into the buffer memory.

20. The memory card system of claim 19, wherein the buffer memory comprises at least one of a dynamic random access memory (DRAM), a static random access memory (SRAM), a phase-change random access memory (PRAM), a magnetic random access memory (MRAM), and a ferro-electric random access memory (FRAM).

21. The memory card system of claim 19, wherein the non-volatile memory stores each of the page mapping tables.

22. A write method for a memory card system, the method comprising:
receiving a write request for a page;
performing a write operation on a first log block corresponding to a first data block including the page;
receiving an update request for the page;
performing a write operation on a second log block corresponding to the first data block;
determining whether there is a free page in the first log block;
upon determining that there is no free page in the first log block, copying valid pages of the first log block into free pages of the second log block; and
returning the first data block and the first log block to free blocks and changing the second log block into the first data block.

23. The method of claim 22, wherein the first log block and the second log block are generated from respectively different free blocks.

24. The method of claim 22, further comprising:
updating a page mapping table to show changing the second log block into the first data block.

* * * * *